United States Patent
Naruse et al.

(10) Patent No.: US 8,919,945 B2
(45) Date of Patent: Dec. 30, 2014

(54) INKJET INK, PIGMENT DISPERSION, IMAGE FORMING METHOD, INKJET RECORDING APPARATUS, INK CARTRIDGE, AND PRINT

(75) Inventors: Mitsuru Naruse, Shizuoka (JP); Minoru Hakiri, Shizuoka (JP); Naoya Morohoshi, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 271 days.

(21) Appl. No.: 13/428,289

(22) Filed: Mar. 23, 2012

(65) Prior Publication Data

US 2012/0262518 A1    Oct. 18, 2012

(30) Foreign Application Priority Data

Apr. 12, 2011   (JP) .................... 2011-088540

(51) Int. Cl.
  B41J 2/01    (2006.01)
  B41J 2/175   (2006.01)
  B41J 2/21    (2006.01)
  C09D 11/326  (2014.01)
  C09D 11/38   (2014.01)
  C09D 11/54   (2014.01)
  C08K 5/24    (2006.01)

(52) U.S. Cl.
  CPC ........... B41J 2/17513 (2013.01); B41J 2/2107 (2013.01); B41J 2/211 (2013.01); B41J 2/17503 (2013.01); B41J 2/1752 (2013.01); B41J 2/17553 (2013.01); C09D 11/326 (2013.01); C09D 11/38 (2013.01); C09D 11/54 (2013.01); C08K 5/24 (2013.01)
  USPC ................. 347/100; 347/95; 347/96

(58) Field of Classification Search
  CPC ......... B41J 2/01; B41J 2/2107; B41J 2/2114; B41J 2/2117; B41J 2/211; B41J 2/17503; C09D 11/00; C09D 11/30; C09D 11/322; C09D 11/40; C09D 11/54
  USPC .......... 347/21, 28, 95–100; 106/31.13, 31.6; 523/160, 161
  See application file for complete search history.

(56) References Cited

U.S. PATENT DOCUMENTS 5,492,952 A * 2/1996 Tonogaki et al. ............ 524/192
5,599,859 A * 2/1997 Tonogaki et al. ............ 524/95

(Continued)

FOREIGN PATENT DOCUMENTS

JP      9-25442      1/1997
JP      2004-149600  5/2004

(Continued)

OTHER PUBLICATIONS

U.S. Appl. No. 13/270,374, filed Oct. 11, 2011.

Primary Examiner — Matthew Luu
Assistant Examiner — Rut Patel
(74) Attorney, Agent, or Firm — Cooper & Dunham LLP

(57) ABSTRACT

An inkjet ink including water, a pigment, a polymer, and a hydrazine compound. The polymer does not include an anionic unit and includes a first unit having a carbonyl group capable of reacting with a hydrazino group, and a second unit having at least one of an amino group, a dimethylamino group, and a diethylamino group. The content of the first unit is from 40% to 90% by weight based on the weight of the polymer, and the inkjet ink has a pH of not less than 9.

7 Claims, 2 Drawing Sheets

(56) References Cited

U.S. PATENT DOCUMENTS

| | | | |
|---|---|---|---|
| 6,020,397 A * | 2/2000 | Matzinger | 523/160 |
| 6,786,959 B2 | 9/2004 | Hakiri et al. | |
| 6,890,698 B2 * | 5/2005 | Naruse et al. | 430/270.1 |
| 7,101,919 B2 | 9/2006 | Hasegawa et al. | |
| 7,490,930 B2 | 2/2009 | Morohoshi et al. | |
| 7,798,629 B2 | 9/2010 | Hakiri et al. | |
| 7,815,301 B2 | 10/2010 | Hasegawa et al. | |
| 7,892,340 B2 | 2/2011 | Namba et al. | |
| 7,919,544 B2 | 4/2011 | Matsuyama et al. | |
| 7,938,527 B2 | 5/2011 | Ohshima et al. | |
| 8,083,342 B2 | 12/2011 | Morohoshi et al. | |
| 8,096,651 B2 | 1/2012 | Ohshima et al. | |
| 2004/0061753 A1 * | 4/2004 | Chen et al. | 347/100 |
| 2006/0272543 A1 | 12/2006 | Hakiri et al. | |
| 2006/0279621 A1 | 12/2006 | Morohoshi | |
| 2007/0197685 A1 | 8/2007 | Aruga et al. | |
| 2008/0036830 A1 | 2/2008 | Natori et al. | |
| 2008/0273045 A1 | 11/2008 | Morohoshi et al. | |
| 2009/0114121 A1 | 5/2009 | Morohoshi et al. | |
| 2009/0130313 A1 | 5/2009 | Ohshima et al. | |
| 2009/0162569 A1 | 6/2009 | Morohoshi et al. | |
| 2009/0186162 A1 | 7/2009 | Namba et al. | |
| 2009/0263632 A1 | 10/2009 | Kojima et al. | |
| 2009/0291213 A1 | 11/2009 | Ohshima et al. | |
| 2010/0215855 A1 | 8/2010 | Morohoshi et al. | |
| 2010/0277541 A1 | 11/2010 | Watanabe et al. | |
| 2010/0277548 A1 | 11/2010 | Hakiri et al. | |
| 2010/0279035 A1 | 11/2010 | Namba et al. | |
| 2010/0302306 A1 | 12/2010 | Hasegawa et al. | |
| 2010/0302326 A1 | 12/2010 | Morohoshi et al. | |
| 2010/0309260 A1 | 12/2010 | Hakiri et al. | |
| 2011/0057981 A1 | 3/2011 | Aruga et al. | |
| 2011/0071250 A1 | 3/2011 | Naruse et al. | |
| 2011/0074865 A1 | 3/2011 | Hasegawa et al. | |
| 2011/0267398 A1 | 11/2011 | Hakiri et al. | |
| 2012/0026237 A1 | 2/2012 | Hakiri et al. | |
| 2012/0044293 A1 | 2/2012 | Morohoshi et al. | |

FOREIGN PATENT DOCUMENTS

| | | |
|---|---|---|
| JP | 2004149600 A * | 5/2004 |
| JP | 2006-16458 | 1/2006 |
| JP | 2010-269545 | 12/2010 |

* cited by examiner

INKJET INK, PIGMENT DISPERSION, IMAGE FORMING METHOD, INKJET RECORDING APPARATUS, INK CARTRIDGE, AND PRINT

CROSS-REFERENCE TO RELATED APPLICATIONS

This patent application is based on and claims priority pursuant to 35 U.S.C. §119 to Japanese Patent Application No. 2011-088540, filed on Apr. 12, 2011 in the Japan Patent Office, the entire disclosure of which is hereby incorporated herein by reference.

TECHNICAL FIELD

This disclosure relates to an inkjet ink. In addition, this disclosure relates to a pigment dispersion for use in the inkjet ink. Further, this disclosure relates to an image forming method, and an inkjet recording apparatus, which form images using the inkjet ink. Furthermore, this disclosure relates to an ink cartridge containing the inkjet ink, and to a print formed by the inkjet ink.

BACKGROUND

Since inkjet recording methods have advantages over other image forming methods such that the image recording process is simple; full color images can be easily formed; and high resolution images can be easily formed by an image forming apparatus having a simple structure, the inkjet recording methods have become widespread. Inkjet recording methods typically include ejecting ink droplets using an air bubble generated in the ink by heat, or using a pressure generated in the ink by piezoelectricity or electrostatic force, so that the ink droplets are adhered to a recording material such as paper sheets; and then drying the ink droplets, or allowing the ink droplets to penetrate into the recording material so that the ink droplets dry, resulting in formation of an ink image on the recording material. Thus, inkjet recording methods are simple, and can be used not only for personal purposes but also for industrial purposes such as printers and printing machines.

With expansion of industrial applications of inkjet recording, a need exists for an inkjet recording apparatus which can form images on various recording materials (such as various papers) at a high speed. Specifically, a need exists for an inkjet printer having a line recording head to form images at a high speed. In addition, an increasing need exists for an inkjet printer, which uses an aqueous ink from environmental and safety standpoint.

However, image formation using an aqueous ink is considerably affected by the recording material used, and various image problems are caused. Particularly, when a paper having a rough surface is used as a recording material, various problems are remarkably caused. Since aqueous inks have a long drying time while having good affinity for paper, aqueous inks easily penetrate into paper. Particularly, when an aqueous ink image is formed on an uncoated paper having a rough surface, the colorant included in the aqueous ink penetrates into the paper, thereby causing a problem in which a low density image is formed and which is not caused when using a solvent ink.

Particularly, when high speed image formation is performed by using an aqueous ink, a penetrant is typically included in the aqueous ink to shorten the drying time of the ink adhered to a recording material. However, when a penetrant is included in an aqueous ink, not only the permeability of water to recording materials but also the permeability of the colorant included in the aqueous ink are enhanced, thereby decreasing the image density of the resultant images more seriously than in a case where the penetrant is not used for the aqueous ink.

In attempting to solve the low image density problem, there is a proposal for an ink which include a colorant, and a crosslinking component including a urethane acrylic resin having a carbonyl group, and a dihydrazide compound. However, unless water included in the ink penetrates into a recording paper, the urethane acrylic resin is not contacted with the dihydrazide compound, and therefore the crosslinking reaction cannot be induced. Thus, at a time when the ink is adhered to a recording paper, the crosslinking reaction is not induced, and therefore the viscosity of the ink adhered to the recording paper hardly increases. Therefore, most part of the colorant penetrates into the recording paper, and occurrence of the low image density problem cannot be prevented.

In addition, there is a proposal for a combination of a black ink including a polymer dispersant having a cationic group and an anionic color ink. The cationic polymer dispersant is obtained from a cationic monomer, a hydrophobic monomer and another monomer, wherein dimethylacrylamide is exemplified as the cationic monomer, styrene or acrylate is exemplified as the hydrophobic monomer, and diacetone acrylamide is exemplified as the other monomer. In this proposal, by contacting the cationic black ink with the anionic color ink, the inks are agglomerated, thereby preventing formation of a blurred image and occurrence of penetration of the inks into a recording paper. However, when the black ink or the color ink is used alone, it is difficult to avoid the low image density problem.

In addition, there is a proposal for an ink including a colorant which is covered with a polymer having a N-substituted acrylamide unit and a carbonyl group, and a hydrazine compound, wherein dimethylacrylamide is exemplified as the N-substituted acrylamide monomer, and diacetone acrylamide is exemplified as the monomer having a carbonyl group, and wherein the ratio of the N-substituted acrylamide monomer is not less than 50% and the ratio of the monomer having a carbonyl group is not greater than 30%.

However, in this ink, the crosslinking reaction of the colorant with the hydrazine compound proceeds after the ink is dried (i.e., after water therein is evaporated). Therefore, the viscosity of the ink hardly increases at a time the ink is adhered to a recording material, and the low image density problem cannot be avoided. In addition, since the colorant covered with the polymer has poor hydrophilicity, it is necessary to introduce an anionic unit (such as acrylic acid) into the polymer in order to impart good dispersing ability to the colorant. In this case, another problem in that the viscosity of the ink increases is caused. Further, since the N-substituted acrylamide unit is altered by heat so as to be insoluble in water, the ink has poor preservation stability.

For these reasons, the inventors recognized that there is a need for an inkjet ink which has good preservation stability and which can form high density images on both a paper with a smooth surface and a paper with a rough surface.

SUMMARY

As an aspect of this disclosure, an inkjet ink is provided which includes water, a pigment, a polymer, and a hydrazine compound. The polymer does not include an anionic unit and includes a first unit having a carbonyl group capable of reacting with a hydrazino group, and a second unit having at least one of an amino group, a dimethylamino group, and a diethylamino group. The content of the first unit is from 40% to 90% by weight based on the weight of the polymer, and the inkjet ink has a pH of not less than 9.

As another aspect of this disclosure, a pigment dispersion is provided which includes a dispersion medium, a pigment dispersed in the dispersion medium, and the polymer mentioned above, which is dissolved or dispersed in the dispersion medium. The pigment dispersion has a pH of from 9 to 11.

As yet another aspect of this disclosure, an image forming method is provided which includes treating a surface of a recording material with a pretreatment liquid including an acidic compound; and then forming an ink image on the treated surface of the recording material using the inkjet ink mentioned above.

As a further aspect of this disclosure, an ink cartridge is provided which includes a first container containing the pretreatment liquid mentioned above, and a second container containing the inkjet ink mentioned above.

As a still further aspect of this disclosure, an inkjet recording apparatus is provided which includes the ink cartridge mentioned above, and a recording head to eject droplets of the above-mentioned pretreatment liquid contained in the first container of the ink cartridge to treat a surface of a recording material with the pretreatment liquid, followed by ejecting droplets of the above-mentioned inkjet ink contained in the second container of the ink cartridge to form an image on the treated surface of the recording material.

As a still further aspect of this disclosure, a print is provided which includes a support and an ink image formed on the support using the inkjet ink mentioned above.

The aforementioned and other aspects, features and advantages will become apparent upon consideration of the following description of the preferred embodiments taken in conjunction with the accompanying drawings.

DETAILED DESCRIPTION

Figure 1:
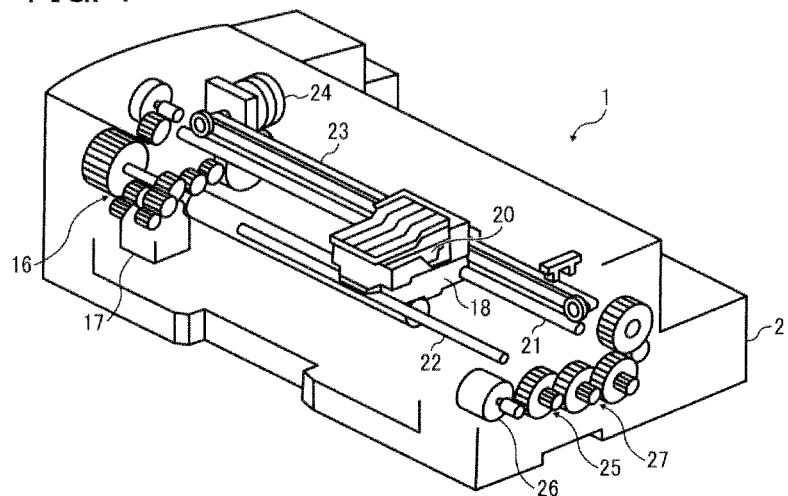
FIG. 1 is a schematic view illustrating an example of the inkjet recording apparatus of this disclosure.

Initially, the inkjet ink of this disclosure will be described.

The inkjet ink of this disclosure (hereinafter sometimes referred to as an ink) includes water, a pigment, a polymer, and a hydrazine compound. The polymer does not include an anionic unit and includes a first unit having a carbonyl group capable of reacting with a hydrazino group, and a second unit having at least one of an amino group, a dimethylamino group, and a diethylamino group. The content of the first unit is from 40% to 90% by weight based on the weight of the polymer, and the inkjet ink has a pH of not less than 9. The pigment is dispersed in the inkjet ink and the polymer is dissolved or dispersed (as an emulsion or the like) in the inkjet ink.

By including such a polymer and a hydrazine compound in an ink while properly controlling the pH of the ink, the viscosity of the ink increases when being adhered to a recording paper whereas the ink itself has good stability. Thus, the ink of this disclosure has good preservation stability and can produce high density images.

The inkjet ink of this disclosure has been made as follows.

Since it is known that a carbonyl group included in a polymer induces a crosslinking reaction with a hydrazide compound, this reaction is often used for imparting a good water resistivity to a resin having a carbonyl group. However, since this crosslinking reaction is slow in water (i.e., aqueous ink) and proceeds after the ink is dried, increase in viscosity of the ink caused by the crosslinking reaction is hardly caused just after the ejected ink is adhered to a recording paper, because the ink adhered to the recording paper maintains a liquid state. Therefore, when a rough paper is used as a recording material, the crosslinking reaction is induced after the ink penetrates into the rough paper and is then dried, and the low density image problem cannot be avoided.

In order to proceed the crosslinking reaction in water, it is necessary to increase the number of carbonyl groups, which serve as crosslinking points. However, when the number of carbonyl groups is increased, the affinity of the ink for water deteriorates, and it is necessary to introduce a hydrophilic group such as acrylic acid into the polymer. However, when such a hydrophilic group is introduced into the polymer, the viscosity of the aqueous solution of the polymer seriously increases to an extent such that the resultant ink including the polymer cannot be ejected from a nozzle.

As a result of the present inventors' investigation, it is discovered that a polymer obtained from a monomer (hereinafter referred to as a monomer A) having a carbonyl group capable of reacting with a hydrazino group, and another monomer (hereinafter referred to as a monomer B) having at least one of an amino group, a dimethylamino group, and a diethylamino group is used, increase in viscosity of the ink can be avoided. In this regard, in order that a crosslinking reaction is induced in water, the content of the monomer A is preferably not less than 30% by weight (namely, the content of the monomer B cannot be increased). Therefore, increase in viscosity of the ink cannot be sufficiently prevented, and the ink has insufficient preservation stability.

However, the present inventors discover that by controlling the pH of the ink so as to be not less than 9, a good combination of viscosity and preservation stability can be imparted to the ink, and therefore occurrence of the low density image problem can be prevented. In addition, it is also discovered that by controlling the ratio of the monomer A to be from 40% to 90% by weight while controlling the pH of the ink so as to be not less than 9, a good combination of viscosity and preservation stability can be imparted to the ink. In this regard, the pH of the ink is preferably not greater than 11. When the pH of the ink is not less than 12, a problem in that the recording heads and the ink feeding members of the inkjet recording apparatus are corroded is easily caused, and therefore the ink cannot be used as an inkjet ink.

The polymer mentioned above for use in the ink of this disclosure can be typically prepared by a method in which a monomer A and a monomer B are copolymerized, or a method including performing copolymerization using an ethylenic type unsaturated monomer having a first group which is changeable to a reactive carbonyl group instead of the monomer A, and/or using an ethylenic unsaturated monomer having a second group which is changeable to a dimethylamino group or a diethylamino group instead of the monomer B; and then converting the first group to a carbonyl group and/or converting the second group to a dimethylamino or diethylamino group.

In this regard, another monomer, which is a hydrophobic monomer having no anionic group, can be optionally copolymerized with monomers A and B as long as the resultant polymer can produce the above-mentioned effect of this disclosure. Specifically, the polymer for use in the ink of this disclosure can be prepared by copolymerizing a monomer composition including monomers A and B as essential components, and optionally including another monomer (hereinafter sometimes referred to as a monomer C), which is described below, in an amount such that the effect of this disclosure can be produced, using a known method such as methods in which the reaction is performed in a nitrogen atmosphere using a polymerization initiator and a polymerization inhibitor. Specifically, the polymer is prepared using the following monomers (A) and (B) or (A), (B) and (C).
(A) Monomer A or an ethylenic type unsaturated monomer having a group changeable to a reactive carbonyl group;
(B) Monomer B or an ethylenic type unsaturated monomer having a group changeable to a dimethylamino group or a diethylamino group; and
(C) A vinyl monomer which has a hydrophobic group and which does not have an anionic group such as carboxylic acid groups and sulfonic acid groups.

Suitable groups for use as the carbonyl group reactive with a hydrazino group include an acetoacetyl group having the following formula (1) and a group having the following formula (2):

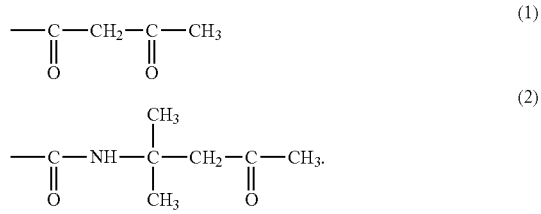

Specific examples of the ethylenic type unsaturated monomers having a carbonyl group reactive with a hydrazino group or a group changeable to such a carbonyl group include diacetone compounds such as diacetone acrylamide, diacetone methacrylamide, diacetone acrylate, acetoacetoxy acrylamide, acetoacetoxy methacrylamide, acetoacetoxy acrylate, acetoacetoxy methacrylate, allylidene diacetate, 2-methallylidene diacetate, 2-phenylallylidene diacetate, crotylidene diacetate, cinnamylidene diacetate, allylidene dibenzoate, and allylidene benzoate acetate; alkylene glycol esters of (meth)acrylic acid and acetoacetic acid such as allyl acetoacetate, 2-acetoacetoxy ethyl acrylate, 2-acetoacetoxy ethyl methacrylate, 2-acetoacetoxy propyl acrylate, 2-acetoacetoxy propyl methacrylate, and 2-cyanoacetoacetoxy ethyl methacrylate; alkylene glycol esters of crotonic acid and acetoacetic acid such as 2-acetoacetoxy ethyl crotonate, and 2-acetoacetoxy propyl crotonate; acetoacetic acid esters of N-alkylol(meth)acrylamide such as N-(acetoacetoxymethyl) acrylamide, N-(acetoacetoxymethyl)methacrylamide, N-(acetoacetoxyethyl)acrylamide, and N-(acetoacetoxyethyl)methacrylamide; and acetoacetyl compounds of ethylenic type unsaturated monomers having a hydroxyl group such as 2-hydroxyethyl acrylate, 2-hydroxyethyl methacrylate, hydroxypropyl acrylate, 2-hydroxy-3-chloropropyl methacrylate, 1,4-butylene glycol monoacrylate, 1,4-butylene glycol monomethacrylate, N-methylolacrylamide, N-methylolmethacrylamide, and hydroxystyrene.

Among these compounds, diacetone acrylamide and allyl acetoacetate are preferable because of having a good copolymerizing ability and such a good quality stability as to be preferably used for preparing a polymer by an industrial production method.

The content of the unit obtained from an ethylenic unsaturated monomer having a carbonyl group reactive with a hydrazino group is from 40% to 90% by weight, preferably from 50% to 90% by weight, and more preferably from 60% to 90% by weight, based on the weight of the polymer. When the content is less than 40% by weight, the low image density preventing effect is hardly produced. In contrast, when the content is greater than 90% by weight, the preservation stability of the ink tends to deteriorate.

Specific examples of the ethylenic unsaturated monomers having a dimethylamino group or a diethylamino group include N,N-dimethylamino ethyl acrylate, N,N-dimethylamino ethyl methacrylate, N,N-dimethyl acrylamide, and N,N-dimethyl methacrylamide. Among these compounds, N,N-dimethylamino ethyl acrylate, and N,N-dimethylamino ethyl methacrylate are preferable because the resultant ink can have good preservation stability while producing high density images. When the hydrocarbon group connected with the nitrogen atom is longer than an ethyl group, the polymer becomes insoluble in water when the temperature increases, and therefore it is not preferable.

Specific examples of the vinyl monomers having a hydrophobic group including no anionic group such as carboxylic acid groups and sulfonic acid groups include vinyl styrene, vinyl naphthalene, derivatives of vinyl styrene and vinyl naphthalene, and (meth)acrylates.

The above-mentioned polymer is soluble or dispersed (as an emulsion or the like) in a dispersion medium including water, and preferably has a weight average molecular weight of from 100 to 200,000. When the polymer is used as a dispersant for a pigment, the weight average molecular weight is from 300 to 50,000.

Suitable materials for use as the hydrazine compound include polyfunctional hydrazide compounds. Specific examples thereof include carbohydrazide, oxalic dihydrazide, malonic dihydrazide, succinic dihydrazide, glutaric dihydrazide, adipic dihydrazide, pimelic dihydrazide, suberic dihydrazide, azelaic dihydrazide, sebacic dihydrazide, dodecanediohydrazide, hexadecanediohydrazide, terephthalic dihydrazide, isophthalic dihydrazide, 2,6-naphthoic dihydrazide, 4,4'-bisbenzene dihydrozide, 1,4-cyclohexane dihydrazide, tartaric dihydrazide, malic dihydrazide, iminodiacetic dihydrazide, N,N'-hexamethylenebissemicarbazide, itaconic dihydrazide, ethylenediamine tetraacetic tetrahydrazide, citric trihydrazide, butane tricarbohydrazide, 1,2,3-benzene trihydrazide, 1,4,5,8-naphthoic tetrahydrazide, nitriloacetic trihydrazide, cyclohexanetricarboxylic trihydrazide, pyromellitic tetrahydrazide, and polyacrylic hydrazide (i.e., N-aminopolyacrylamide). In addition, polyfunctional hydrazide derivatives, which are prepared by reacting these polyfunctional hydrazide compounds with a ketone such as acetone and methyl ethyl ketone can also be used.

Among these compounds, adipic dihydrazide and polyacrylic hydrazide are preferable from a viewpoint of safety and reactivity with a carbonyl group.

The added amount of such a hydrazine compound is determined based on the polymer used and the amount of the polymer, but is generally from 1 part to 100 parts by weight, preferably from 5 parts to 50 parts by weight, and more preferably from 8 parts to 20 parts by weight, based on 100 parts by weight of the polymer used, because the resultant ink can produce high density images.

Such a polymer as mentioned above does not serve as a dispersant under normal conditions but can adsorb on a pigment in a pigment dispersion when the pigment dispersion has a pH of not less than 9, and therefore the pigment can be satisfactorily dispersed in the pigment dispersion. When the pH is less than 9, a pigment is insufficiently dispersed. In addition, the dispersing effect is hardly produced if a pigment is dispersed at a pH of less than 9 and then the pH of the pigment dispersion is adjusted so as to be not less than 9.

Thus, when the above-mentioned polymer is used as a dispersant while the pH of the ink component liquid including at least water, the polymer and a pigment so as to be not less than 9, an aqueous pigment dispersion, in which the pigment is satisfactorily dispersed because the polymer is adhered to the pigment to cover the pigment, can be prepared. Therefore, the resultant ink can form high density images. The pH of the pigment dispersion is preferably from 9 to 11.

The added amount of such a polymer is determined based on the formula of the ink (e.g., the added amounts and properties of the monomers used), and is preferably from 0.01% to 3% by weight based on the weight of the pigment included in the ink.

The pretreatment liquid for use in the image forming method and apparatus is not particularly limited as long as the liquid is acidic and water-soluble. Specific examples thereof include inorganic acidic materials such as hydrochloric acid, nitric acid, sulfuric acid, and ammonium sulfate; other acidic materials such as acetic acid, lactic acid, and salts thereof. Among these materials, sodium lactate is preferable because high density images can be formed on the surface of a recording paper on which the pretreatment liquid has been applied.

The pretreatment liquid can optionally include additives such as resins, wetting agents, surfactants, penetrants, pH controlling agents, antiseptics, antifungal agents, chelating agents, antirust agents, antioxidants, ultraviolet absorbents, oxygen absorbents, and light stabilizers. These additives are similar to additives for use in the pigment dispersion, which will be described later in detail.

Specific examples of the method for applying the pretreatment liquid on a recording material include inkjet coating methods, spray coating methods, roll coating methods, and wire bar coating methods.

The inkjet ink of this disclosure includes a pigment as a colorant so that ink images have good light resistance.

Specific examples of the material for use as a black color pigment include carbon black such as KETJEN BLACK, furnace black, acetylene black, thermal black, and gas black. Carbon black, which is subjected to an acidic treatment or an alkaline treatment, can be preferably used. In addition, carbon black, which is covered with a resin or which is subjected to a grafting treatment or an encapsulating treatment can also be used.

Specific examples of the material for use as a magenta pigment include Pigment Reds 5, 7, 12, 48 (Ca), 48 (Mn), 57 (Ca), 57:1, 112, 122, 123, 168, 184 and 202; and Pigment Violet 19.

Specific examples of the material for use as a cyan pigment include Pigment Blues 1, 2, 3, 15, 15:3, 15:4, 16, 22 and 60; and Vat Blue 4 and 60.

Specific examples of the material for use as a yellow pigment include Pigment Yellows 1, 2, 3, 12, 13, 14, 16, 17, 73, 74, 75, 83, 93, 95, 97, 98, 114, 120, 128, 129, 138, 150, 151, 154, 155 and 180.

Among these pigments, it is preferable to use a combination of Pigment Yellow 74, Pigment Red 122 or Pigment Violet 19, and a Pigment Blue 15, because the resultant full color images have good color tones, and light resistance (i.e., a well-balanced ink set can be provided).

The content of a pigment in the pigment dispersion of this disclosure is preferably from 0.1% to 50% by weight, and more preferably from 0.1% to 30% by weight, based on the weight of the pigment dispersion.

Suitable materials for use as the dispersant for dispersing a pigment include surfactants such as anionic surfactants, cationic surfactants, ampholytic surfactants, and nonionic surfactants; and polymer dispersants.

Specific examples of the anionic surfactants include alkylsulfocarboxylates, α-olefin sulfonates, polyoxyethylene alkyl ether acetates, N-acylamino acids and salts thereof, salts of N-acyl-N-methyl taurine, alkyl sulfates, polyoxyalkylether sulfates, polyoxyethylene alkyl ether phospates, rosin acid soaps, salts of sulfates of castor oil, salts of sulfates of lauryl alcohol, alkylphenol-type phosphates, formalin condensates of naphthalenesulfonate, alkyl-type phosphates, alkylarylsulfonates, diethylsulfosuccinates, diethylhexylsulfosuccinates, and dioctylsulfosuccinates.

Specific examples of the cationic surfactants include 2-vinylpiridine derivatives, and poly-4-vinylpiridine derivatives.

Specific examples of the ampholytic surfactants include lauryldimethylaminoacetic acid betaine, 2-alkyl-N-carboxymethyl-N-hydroxyethylimidazolinium betaine, palm oil fatty acid amide propyldimethylaminoacetic acid betaine, polyoctylpolyaminoethylglycine, and imidazoline derivatives.

Specific examples of the nonionic surfactants include ethers such as polyoxyethylene alkyl ethers and polyoxyalkylaryl ethers (e.g., polyoxyethylene nonylphenyl ether, polyoxyethylene octylphenyl ether, polyoxyethylene dodecylphenyl ether, polyoxyethylene lauryl ether, and polyoxyethylene oleyl ether); esters (e.g., polyoxyethylene monooleate, polyoxyethylene monostearate, polyoxyethylene distearate, sorbitan laurate, sorbitan monostearate, sorbitan monooleate, and sorbitan sesquioleate; and acetylene glycols (e.g., 2,4,7, 9-tetramethyl-5-decyne-4,7-diol, 3,6-dimethyl-4-octyne-3, 6-diol, and 3,5-dimethyl-1-hexyne-3-ol.

When the pigment is carbon black, an anionic surfactant such as a formalin condensate of naphthalene sulfonate is preferably used as a dispersant to prepare a carbon black dispersion in which the carbon black is satisfactorily dispersed. Particularly, when the pigment content is not less than 20% by weight, such an anionic surfactant has better dispersing ability than any other dispersants. However, in order that the resultant ink can produce high density images, the above-mentioned polymer compound is preferably used as a dispersant.

Among various carbon blacks, carbon blacks having a BET surface area of from 100 $m^2/g$ to 400 $m^2/g$ and an average primary particle diameter of from 10 nm to 30 nm are preferably used so that the resultant ink can produce high density images.

The added amount of a dispersant for use in dispersing a pigment is determined based on the properties of the pigment used, and is preferably from 0.005 parts to 5 parts by weight based on 1 part by weight of the pigment used. In this regard, when carbon black is used as a pigment and the added amount of a dispersant is from 0.01 parts to 2 parts by weight, a carbon black dispersion in which carbon black is evenly dispersed such that the dispersion can be practically used can be prepared, but the added amount is preferably from 0.02 parts to 0.5 parts by weight based on 1 part by weight of the pigment used (i.e., carbon black). Specifically, when the added amount of a dispersant is from 0.01 parts to 2 parts by weight, a pigment can be satisfactorily dispersed and the resultant pigment dispersion and ink have good preservation stability. Particularly, when the added amount is from 0.02 parts to 0.5 parts by weight, the resultant pigment dispersion and ink have excellent preservation stability.

The pigment dispersion and ink of this disclosure include water as a dispersing medium. In addition, a water-soluble organic solvent can be optionally used in combination with water.

Specific examples of such water-soluble organic solvents include alcohols such as methanol, ethanol, 1-propanol and 2-propanol; polyalcohols such as ethylene glycol, diethylene glycol, triethylene glycol, polypropylene glycol, and glycerin; pyrrolidone derivatives such as N-methyl-2-pyrrolidone, and 2-pyrrolidone; ketones such as acetone and methyl ethyl ketone; and alkanol amines such as monoethanolamine, diethanolamine, and triethanolamine.

The pigment dispersion of this disclosure can include additives such as wetting agents, surfactants, penetrants, pH controlling agents, antiseptics, antifungal agents, chelating agents, antirust agents, antioxidants, ultraviolet absorbents, oxygen absorbents, and light stabilizers.

Specific examples of the wetting agents include polyalcohols, polyalcohol alkyl ethers, polyalcohol aryl ethers, nitrogen-containing heterocyclic compounds, amides, amines, sulfur-containing compounds, propylene carbonate, ethylene carbonate, and other wetting agents. These compounds can be used alone or in combination.

Specific examples of the polyalcohols include ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentanediol, 1,6-hexanediol, glycerin, trimethylol ethane, trimethylol propane, 1,2,3-butanetriol, 1,2,4-butanetriol, 1,2,6-hexanetriol, and petriol.

Specific examples of the polyalcohol alkyl ethers include ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, and propyleneglycol monoethyl ether.

Specific examples of the polyalcohol aryl ethers include ethyleneglycol monophenyl ether, and ethyleneglycol monobenzyl ether.

Specific examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, and γ-butyrolactone.

Specific examples of the amides include formamide, N-methylformamide, and N,N-dimethylformamide.

Specific examples of the amines include monoethanolamine, diethanolamine, triethanolamine, monoethylamine, diethylamine, and triethylamine.

Specific examples of the sulfur-containing compounds include dimethylsulfoxide, sulfolane, and thiodiethanol.

Saccharide can also be used as wetting agents. Suitable materials for use as the saccharide include monosaccharide, disaccharide, oligosaccharide (including tri- and tetra-saccharide), and polysaccharide. Specific examples of the saccharide include glucose, mannose, fructose, ribose, xylose, arabinose, galactose, maltose, cellobiose, lactose, sucrose, trehalose, and maltotriose. In this regard, polysaccharide is polysaccharide in a broad sense, and include materials such as α-cyclodextrin, and cellulose, which are found in nature. In addition, specific examples of derivatives of the saccharide mentioned above include reduction sugar of the saccharide such as sugar alcohols having a formula $HOCH_2(CHOH)_nCH_2OH$ (n=2-5), oxidized sugar such as aldonic acid and uronic acid, amino acids, and thio acids. Among these materials, sugar alcohols are preferable, and specific examples thereof include maltitol and sorbit.

Among these wetting agents, glycerin, diethylene glycol, triethylene glycol, 1,3-butanediol, 3-methyl-1,3-butanediol, 2-pyrrolidone, and N-methyl-2-pyrrolidone are preferable because a good combination of preservation stability and ejecting property can be imparted to the resultant ink.

The weight ratio of a pigment to a wetting agent significantly influences the ejecting property of the ink from a recording head. When the amount of a wetting agent is relatively small compared to the amount of the pigment included in the ink, water in the surface portion (meniscus) of the ink in a nozzle excessively evaporates, thereby causing a defective ejection problem in that the ink is not satisfactorily ejected from the nozzle.

The content of a wetting agent in the ink of this disclosure is from 20% to 35% by weight, and preferably from 22.5% to 32.5% by weight, based on the weight of the ink so that the ink can have a good combination of drying property, preservability and reliability. When the content of a wetting agent is less than 20% by weight, the defective ejection problem tends to be caused. In contrast, when the content is greater than 35% by weight, the drying property of the ink tends to deteriorate when images are formed on a paper, thereby deteriorating image qualities of the image.

When a surfactant such as the surfactants mentioned above is used, it is preferable to select a proper surfactant in consideration of the properties of the pigment and wetting agent used. In general, it is preferable to use a surfactant which has a low surface tension and a high leveling property without deteriorating the dispersion stability of the pigment used. Specifically, it is preferable to use a fluorine-containing surfactant or a silicone-type surfactant, and it is more preferable to use a fluorine-containing surfactant.

Suitable materials for use as the fluorine-containing surfactant include fluorine-containing surfactants having a fluorine-substituted group having 2 to 16 carbon atoms, and more preferably from 4 to 16 carbon atoms. When the number of carbon atoms of such a fluorine-substituted group is less than 2, the effect of fluorine is not satisfactorily produced. When the number of carbon atoms is greater than 16, the preservability of the ink tends to deteriorate.

Specific examples of such a fluorine-containing surfactant include perfluoroalkylsulfonic acid compounds, perfluoroalkylcarboxylic acid compounds, perfluoroalkylphosphate compounds, perfluoroalkylethyleoxide adducts, and polyoxyalkyleneether polymer compounds having a perfluoroalkylether group in a side chain. Among these compounds, polyoxyalkyleneether polymer compounds having a perfluoroalkylether group in a side chain are preferable because the resultant pigment dispersion and ink hardly foams.

Specific examples of the perfluoroalkylsulfonic acid compounds include perfluoroalkylsulfonic acids, and salts thereof. Specific examples of the perfluoroalkylcarboxylic acid compounds include perfluoroalkylcarboxylic acids, and salts thereof. Specific examples of the perfluoroalkylphosphate compounds include perfluoroalkylphosphates, and salts thereof. Specific examples of the polyoxyalkyleneether polymer compounds having a perfluoroalkylether group in a side chain include polyoxyalkyleneether polymers having a perfluoroalkylether group in a side chain, sulfates thereof, and salts thereof.

Specific examples of the counter ion of salts of these fluorine-containing surfactants include ions of Li, Na, K, $NH_4$, $NH_3CH_2CH_2OH$, $NH_2(CH_2CH_2OH)_2$, and $NH(CH_2CH_2OH)_3$.

Synthesized or marketed fluorine-containing surfactants can be used. Specific examples of the marketed fluorine-containing surfactants include FS-300 from Du Pont; FT-110, FT-250, FT-251, FT-400S, FT-150 and FT-400SW from Neos Co., Ltd.; and PF-151N from Omnova Solutions.

The silicone-type surfactant for use in the ink is not particularly limited. However, it is preferable to use a silicone-type surfactant which hardly decomposes at a high pH. Specific examples thereof include polydimethylsiloxane, whose side chain is modified, polydimethylsiloxane, both of whose ends are modified, polydimethylsiloxane, one of whose ends is modified, and polydimethylsiloxane, in which both ends and side chains thereof are modified. In this regard, the group used for modification is preferably a polyoxyethylene group, or a polyoxyethylenepolyoxypropylene group because the resultant silicone-type surfactant has good properties as a water-soluble surfactant.

Synthesized or marketed silicone-type surfactants can be used. Marketed silicone-type surfactants are available from Byk Chemie, Shin-Etsu Chemical Co., Ltd., and Dow Corning Toray silicone Co., Ltd.

The content of a surfactant in the ink is preferably from 0.01% to 3.0% by weight, and more preferably from 0.5% to 2.0% by weight, based on the weight of the ink. When the content is less than 0.01% by weight, the effect of the surfactant is hardly produced. When the content is greater than 3.0%, the ink tends to excessively penetrate into a recording paper, thereby causing the low density image problem and the ink penetration problem in that an ink image penetrates through a recording material to an extent such that the image can be seen from the backside of the recording material.

The penetrant for use in the pigment dispersion of this disclosure is preferably a polyol compound which can be dissolved in water at 20° C. in an amount of from 0.2% to 5.0% by weight. Specific examples of such a polyol compound include aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,2,4-trimethyl-1,3-pentanediol, 2,5-dimethyl-2,5-hexanediol, 2-ethyl-1,3-hexanediol, and 5-hexene-1,2-diol. Among these compounds, 2-ethyl-1,3-hexanediol, and 2,2,4-trimethyl-1,3-pentanediol are preferable.

Another compound, which can be dissolved in the ink and which can adjust a property of the ink so as to fall in a desired range, can be used as a penetrant in combination with the above-mentioned penetrant. Specific examples thereof include alkyl or aryl ethers of polyalcohols such as diethylene glycol monophenyl ether, ethylene glycol monophenyl ether, ethylene glycol monoallyl ether, ethylene glycol monobutyl ether, propylene glycol monobutyl ether, and tetraethylene glycol chlorophenyl ether; and lower alcohols such as ethanol.

The content of a penetrant in the ink is preferably from 0.1% to 4.0% by weight based on the weight of the ink. When the content is less than 0.1% by weight, the ink adhered to a recording paper is not dried rapidly, thereby often forming a blurred image. When the content is greater than 4.0% by weight, the dispersibility of a colorant in the ink tends to deteriorate, thereby often causing a nozzle clogging problem in that a nozzle is clogged with aggregated particles of the colorant. In addition, the ink excessively penetrates into a recording paper, thereby causing the low density image problem and the ink penetration problem.

Any pH controlling agents can be used as long as the pH controlling agents can adjust the pH of the ink so as to be from 9 to 11 without deteriorating other properties of the ink. Suitable materials for use as the pH controlling agent include alcohol amines, alkali metal hydroxides, ammonium hydroxides, phosphonium hydroxides, and alkali metal carbonates. When the pH of the ink is greater than 11, the recording head used and the ink supplying unit used are easily dissolved by the ink, thereby causing problems in that the properties of the ink change, the ink leaks from the recording head and the ink supplying unit, and the ink is not satisfactorily ejected from nozzles. When the pH is less than 9, the viscosity and preservation stability of the ink cannot be satisfactorily improved.

Specific examples of the alcohol amines include diethanolamine, triethanolamine, and 2-amino-2-ethyl-1,3-propanediol.

Specific examples of the alkali metal hydroxides include lithium hydroxide, sodium hydroxide, and potassium hydroxide.

Specific examples of the ammonium hydroxides include ammonium hydroxide, hydroxides of quaternary ammoniums, and hydroxides of quaternary phosphoniums.

Specific examples of the alkali metal carbonates include lithium carbonate, sodium carbonate, and potassium carbonate.

Specific examples of the antiseptics/antifungal agents include sodium dehydroacetate, sodium sorbate, sodium 2-pyridinethiol-oxide, sodium benzoate, and sodium pentachlorophenol.

Specific examples of the chelating agent include sodium ethylenediaminetetraacetate, sodium nitrilotriacetate, sodium hydroxyethylethylenediaminetriacetate, sodium diethylenetriaminepentaacetate, and sodium uramildiacetate.

Specific examples of the antirust include acidic sulfites, sodium thiosulfate, ammonium thiodiglycolate, diisopropylammonium nitrite, pentaerythritol tetranitrate, and dicyclohexylammonium nitrite.

Suitable materials for use as the antioxidant include phenol-type antioxidants (including hindered phenol-type antioxidants), amine-type antioxidants, sulfur-containing antioxidants, and phosphorous-containing antioxidants.

Specific examples of the phenol-type antioxidants include butylated hydroxyanisole, 2,6-di-t-butyl-4-ethylphenol, stearyl-β-(3,5-di-t-butyl-4-hydroxyphenyl)propionate, 2,2'-methylenebis(4-methyl-6-t-butylphenol), 2,2'-methylenebis(4-ethyl-6-t-butylphenol), 4,4'-butylidenebis(3-methyl-6-t-butylphenol), 3,9-bis{1,1-dimethyl-2-[β-(3-t-butyl-4-hydroxy-5-methylphenyl)propionyloxy]ethyl}-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3', 5'-di-t-butyl-4'-hydroxyphenyl)propionate]methane, 2,6-di-t-butyl-p-cresol, 2,6-di-t-butylphenol, 2,4-dimethyl-6-t-butylphenol, butylhydroxyanisole, 4,4'-thiobis(3-methyl-6-t-butylphenol), tetrakis[methylene-3-(3,5-di-t-butyl-4-dihydroxyphenyl)propionate]methane, and 1,1,3-tris(2-methyl-4-hydroxy-5-t-butylphenyl)methane.

Specific examples of the amine-type antioxidants include phenyl-β-naphtylamine, α-naphthylamine, N,N'-di-sec-butyl-p-phenylenediamine, phenothiazine, and N,N'-di-phenyl-p-phenylenediamine.

Specific examples of the sulfur-containing antioxidants include dilauryl-3,3'-thiodipropionate, distearylthiodipropionate, laurylstearylthiodipropionate, dimyristyl-3,3'-thiodipropionate, distearyl-β-β'-thiodipropionate, 2-mercaptobenzoimidazole, and dilaurylsulfide.

Specific examples of the phosphorous-containing antioxidants include triphenyl phosphite, octadecyl phosphite, triisodecyl phosphite, trilauryl trithiophosphite, and trinonylphenyl phosphite.

Suitable materials for use as the ultraviolet absorbent include benzophenone-type ultraviolet absorbents, benzotriazole-type ultraviolet absorbents, salicylate-type ultraviolet absorbents, cyanoacrylate-type ultraviolet absorbents, and nickel complex-type ultraviolet absorbents.

Specific examples of the benzophenone-type ultraviolet absorbents include 2-hydroxy-4-n-octoxybenzophenone, 2-hydroxy-4-n-dodecyloxybenzophenone, 2,4-dihydroxybenzophenone, 2-hydroxy4-methoxybenzophenone, and 2,2',4,4'-tetrahydroxybenzophenone.

Specific examples of the benzotriazole-type ultraviolet absorbents include 2-(2'-hydroxy-5'-t-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-t-butyl-5'-methylphenyl)-5-chlorobenzotriazole.

Specific examples of the salicylate-type ultraviolet absorbents include phenyl salicylate, p-t-butylphenyl salicylate, and p-octylphenyl salicylate.

Specific examples of the cyanoacrylate-type ultraviolet absorbents include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex-type ultraviolet absorbents include nickelbis(octylphenyl)sulfide, 2,2'-thiobis(4-t-octylferrate)-n-butylaminenickel(II), 2,2'-thiobis(4-t-octylferrate)-2-ethylhexylaminenickel(II), and 2,2'-thiobis(4-t-octylferrate)triethanolaminenickel(II).

The inkjet ink of this disclosure can be prepared by a known method. For example, ink components such as a pigment dispersion, water, a water-soluble organic solvent, a surfactant, etc. are mixed using a mixer such as a sand mill, a ball mill, a roll mill, a bead mill, a nanomizer, a homogenizer, and a supersonic dispersing machine, and the mixture is filtered using a filter or a centrifugal separator to remove coarse particles therefrom, followed by optional deaeration.

The content of a pigment in the ink is preferably from 1% to 20% by weight based on the weight of the ink. When the content is less than 1% by weight, unclear images are formed due to low image density. When the content is greater than 20% by weight, the viscosity of the ink tends to seriously increase, and the nozzle clogging problem tends to be caused.

The content of a water-soluble organic solvent is not less than 50% by weight, preferably from 5% to 40% by weight, and more preferably from 10% to 35% by weight, based on the weight of the ink.

The ink can optionally include such additives as mentioned above for use in the pigment dispersion, e.g., resins, wetting agents, surfactants, penetrants, pH controlling agents, antiseptics, fungicides, chelating agents, antirusts, antioxidants, ultraviolet absorbents, oxygen absorbents, and light stabilizers.

Each of the pretreatment liquid and the ink of this disclosure is used while contained in a container serving as a cartridge. Alternatively, a set of the pretreatment liquid and the ink may be contained in a cartridge. The cartridge is set in an inkjet recording apparatus to record an image on a recording material, thereby forming a print in which the image is formed on the recording material serving as a support.

Figure 4:
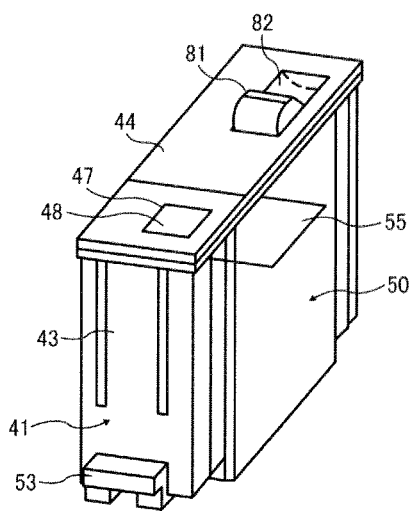
FIG. 4 is a schematic perspective view illustrating an example of the ink cartridge of this disclosure.
Figure 5:
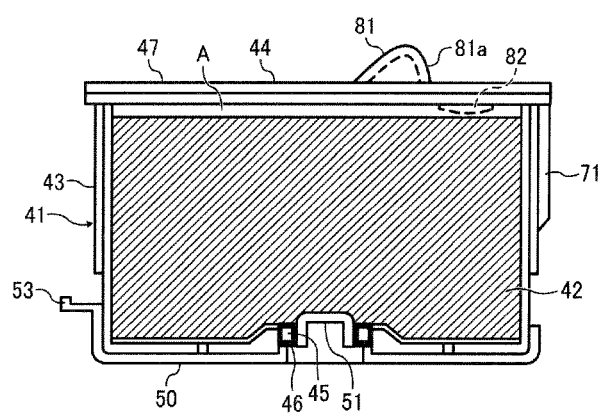
FIG. 5 is a schematic cross-sectional view illustrating the ink cartridge illustrated in FIG. 4.

A cartridge capable of containing any one of the pretreatment liquid and the ink is illustrated in FIGS. 4 and 5.

As illustrated in FIGS. 4 and 5, the cartridge has a cartridge main body 41 in which an ink absorber 42 is contained. The ink absorber 42 absorbs a color ink (e.g., yellow, magenta, cyan or black ink) or a pretreatment liquid. The ink is the inkjet ink of this disclosure. The cartridge main body 41 has a container 43 having a large opening on an upper part thereof and a top cover 44 which is adhered on the container 43 using an adhesive or by welding. The cartridge main body 41 is made of, for example, a resin (a mold of resin). The ink absorber 42 is formed of a porous material such as urethane foams. Such a porous material is contained in the cartridge main body 41 upon application of pressure and then an ink or the pretreatment liquid is injected into the porous material such that the porous material absorbs the ink or the pretreatment liquid.

At the bottom of the cartridge main body 41, an ink supplying opening 45 is provided to supply the ink or the pretreatment liquid to one of the line of nozzles of the recording head 15. A seal ring 46 is engaged with the inside periphery of the ink supplying opening 45. In addition, the upper cover 44 has an air opening 47.

The cartridge main body 41 has a cap 50. The cap 50 covers the ink supplying opening 45 to prevent the ink or the pretreatment liquid contained therein from leaking from the cartridge main body 41 before the cartridge is set in an inkjet recording apparatus. In addition, the cap 50 prevents the ink or the pretreatment liquid from leaking from the main body 41 due to deformation of the case 43 caused by the pressure applied to the wide surface of the cartridge when the cartridge is set, handled or wrapped in vacuum.

A film seal 55 having a high oxygen permeability is adhered on the air opening 47 to seal the air opening 47 as illustrated in FIG. 4. The film seal 55 seals not only the air opening 47 but also plural grooves 48 formed in the vicinity of the air opening 55. By sealing the air opening 47 with a film seal 55 having a high oxygen permeability, the ink or the pretreatment liquid can be effectively deaerated when the cartridge is wrapped under a reduced pressure even when air is dissolved in the ink when the ink is filled in the cartridge or air present in a space A (illustrated in FIG. 5) formed between the ink absorber 42 and the cartridge main body 41 is dissolved in the ink or the pretreatment liquid. Namely, when such a sealed cartridge is wrapped with a packaging material which hardly transmits air, such as films laminated with aluminum, under a reduced pressure, the air dissolved in the ink or the pretreatment liquid can be discharged to the space formed between the cartridge main body 41 and the wrapping material.

Numeral 51 denotes a projection of the cap 50, which is formed to prevent the ink or the pretreatment liquid from leaking from the cartridge main body 41 of the cartridge. Numeral 53 denotes a projection. By pressing the projection 53, the cap 50 can be easily disengaged from the cartridge main body 41. Numeral 71 denotes a projection, from which the content of the cartridge (e.g., the color of the ink in the cartridge) can be determined. Numerals 81 and 82 denote a projection and a recess, by which the cartridge can be easily disengaged from the inkjet recording apparatus. Numeral 81a denotes a portion which is used when detaching or attaching the cartridge from or to the inkjet recording apparatus using a finger.

Specific examples of the method for recording images include continuous ejection methods and on-demand methods. Specific examples of the on-demand methods include piezoelectric ejection methods, thermal ejection methods, and electrostatic ejection methods.

Next, an example of the image forming method and the inkjet recording apparatus of this disclosure will be described by reference to drawings.

An inkjet recording apparatus 1 illustrated in FIG. 1 includes a main body 2 including a cartridge unit 20 having plural cartridges containing the pretreatment liquid mentioned above and plural color inks, each of which is the ink of this disclosure. The pretreatment liquid and the color inks are separately supplied from the cartridges to a recording head. In this regard, the pretreatment liquid and the color inks in the plural cartridges are separated from each other.

Referring to FIG. 1, a recording head 15 set on a carriage 18 is moved in a main scanning direction by a timing belt 23 driven to rotate by a main scanning motor 24 while guided by guide shafts 21 and 22. Meanwhile, a recording material is fed toward the recording head 15 on the carriage 18 by a sub-scanning motor 26 via a gear mechanism including gears 25 and 27. The recording head 15 ejects the pretreatment liquid and the color inks toward the recording material to form a line of image on the recording material. Next, the recording material is fed in a predetermined length by a platen which is rotated by a sub-scanning motor 17 via a gear mechanism 16, and then the recording head 15 ejects again the pretreatment liquid and the color inks toward the recording material to form another line of image on the recording material. By repeating these operations, an image is formed on the recording material.

Figure 2:
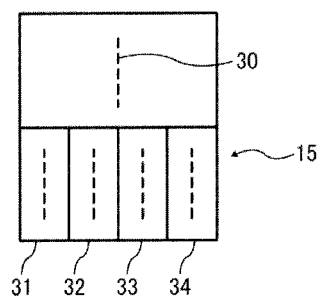
FIG. 2 is a schematic view illustrating a recording head for use in the inkjet recording apparatus of this disclosure.

FIG. 2 illustrates a nozzle surface of an example of the recording head 15. The recording head 15 has a vertical line of nozzles 30 to eject the pretreatment liquid, and four lines of nozzles 31, 32, 33 and 34 to respectively eject yellow, magenta, cyan and black inks.

Figure 3:
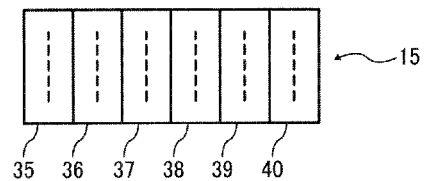
FIG. 3 is a schematic view illustrating another recording head for use in the inkjet recording apparatus of this disclosure.

The recording head 15 illustrated in FIG. 3 has six lines of nozzles 35-40, which are arranged side by side in the lateral direction so that the nozzles 35 and 40 eject the pretreatment liquid, and the nozzles 36-39 eject yellow, magenta, cyan and black inks. Since a line of nozzles to eject the pretreatment liquid is arranged on each end of this recording head 15, the recording head can record images when the recording head is moved forward or backward in the main scanning direction. Specifically, when the recording head 15 is moved forward, one of the nozzle 40, which is a front end when the recording head is moved forward, ejects the pretreatment liquid toward a recording material before the nozzles 39-36 eject color inks. In contrast, when the recording head 15 is moved backward, the other nozzle 35, which is a front end when the recording head is moved backward, ejects the pretreatment liquid toward the recording material before the nozzles 36-39 eject color inks. Therefore, images having constant image density can be stably formed on the recording material even when the images are formed in the forward and backward movement of the recording head 15.

In this inkjet recording apparatus, each of the cartridges can be replaced with a new cartridge when the pretreatment liquid or the color ink in the cartridge is exhausted. In addition, the cartridge may be integrated with a recording head to eject the pretreatment liquid or the color ink.

It is preferable to initially eject the pretreatment liquid toward a portion of a recording material, followed by ejecting one or more of the color inks toward the portion so that color images are formed on the portion coated with the pretreatment liquid. However, it is possible to intermittently eject the pretreatment liquid toward a recording material so that the pretreatment liquid is spread on the entire surface of the recording material due to penetration of the pretreatment liquid or the like, followed by ejecting the color inks toward the pretreated surface of the recording material. Alternatively, it is possible to apply the pretreatment liquid on a portion of a recording material corresponding to an outline portion of an image to be formed, followed by forming the image. Even in this case, a considerable effect can be produced.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Synthesis of Polymer

The following components were fed into a flask equipped with an agitator, a thermometer, a dropping funnel and a reflux condenser.

| | |
|---|---|
| Diacetone acrylamide | 40 parts |
| Dimethylacrylamide | 60 parts |
| Ethanol | 50 parts |

After air in the flask was substituted with a nitrogen gas, the mixture was heated to 80° C. Next, 0.5 parts of 2,2'-azobisisobutyronitrile was dropped into the flask using the dropping funnel to perform a polymerization reaction for 6 hours.

After performing the polymerization reaction, ethanol vapor was fed into the flask to prepare a 50% ethanol solution of a diacetone acrylamide-dimethylacrylamide copolymer. By washing the copolymer with ethanol, followed by drying, a solid diacetone acrylamide-dimethylacrylamide copolymer (hereinafter sometimes referred to as a polymer 1 or DAA(40)-DMA(60)), in which the weight ratio (DAA/DMA) of the diacetone acrylamide unit (DAA) to the dimethylacrylamide unit (DMA) is 40/60, was prepared. The polymer 1 was mixed with distilled water to prepare a 20% aqueous solution of polymer 1.

(Preparation of Pigment Dispersion)

The following components were mixed.

| | |
|---|---|
| Carbon black (gas black) (NIPEX 150 from Degussa AG) | 20 parts |
| 10% Aqueous solution of sodium salt of formalin condensate of naphthalenesulfonic acid | 30 parts |
| Distilled water | 50 parts |

The mixture was subjected to a dispersing treatment using a disc-type batch bead mill (KDL-type bead mill from Shinmaru Enterprises Corp. The dispersing conditions were as follows.

(1) Bead used: Zirconia beads with a diameter of 0.3 mm (2) Peripheral speed of disc: 10 m/s (3) Temperature of the mixture: 10° C.

(4) Dispersing time: 5 minutes

Next, coarse particles were removed from the resultant dispersion using a centrifugal separator (MODEL 3600 from Kubota Corp. As a result, a pigment dispersion 1 having a volume average particle diameter of 120 nm and a standard deviation of particle diameter of 51.2 nm was prepared.

(Preparation of Ink)

The following components were mixed.

| | |
|---|---|
| Pigment dispersion 1 prepared above (Pigment content of 20% by weight) | 40.0 parts |
| Polymer 1 prepared above (20% by weight aqueous solution) | 10.0 parts |
| Glycerin | 5.5 parts |
| 1,3-Butanediol | 16.5 parts |
| 2-Ethyl-1,3-hexanediol | 2.0 parts |
| Fluorine-containing surfactant (ZONYL FS-300 from Du Pont, solid content of 40% by weight) | 2.5 parts |
| Fluoroethylene - vinyl ether alternate copolymer (LUMIFLON FE4300 from Asahi Glass Co., Ltd., solid content of 50%, volume average particle diameter of 150 nm, minimum film forming temperature (MFT) of not higher than 130° C.) | 6.0 parts |
| Distilled water | 17.5 parts |

Next, a 40% aqueous solution of aminoethylpropanediol was added to the mixture to adjust the pH to 10. In addition, 0.4 parts of adipic acid dihydrazide was added thereto, and the mixture was agitated for 30 minutes. Thus, an ink of Example 1 was prepared.

Examples 2 to 4

Synthesis of Polymers

The procedure for preparation of the polymer 1 in Example 1 was repeated except that the ratio (DAA/DMA) was changed as described in Table 1 below.

Thus, 20% aqueous solutions of polymers 2-4 were prepared.
(Preparation of Inks)

The procedure for preparation of the ink 1 in Example 1 was repeated except that the 20% aqueous solution of polymer 1 was replaced with each of the 20% aqueous solutions of polymers 2-4.

Thus, inks of Examples 2 to 4 were prepared.

Example 5

The procedure for preparation of the ink 1 in Example 1 was repeated except that the 20% aqueous solution of polymer 1 was replaced with the 20% aqueous solution of polymer 3 and the pH of the ink was adjusted to 9.

Thus, an ink of Example 5 was prepared.

Example 6

Synthesis of Polymer

The procedure for preparation of the polymer 1 in Example 1 was repeated except that diacetone acylamide was replaced with 60 parts of allyl acetoacetate, the added amount of dimethylacrylamide was changed from 60 parts to 40 parts, and the synthesis conditions were adjusted.

Thus, a 20% aqueous solution of polymer 6 was prepared.
(Preparation of Ink)

The procedure for preparation of the ink 1 in Example 1 was repeated except that the 20% aqueous solution of polymer 1 was replaced with the 20% aqueous solution of polymer 6.

Thus, an ink of Example 6 was prepared.

Example 7

Synthesis of Polymer

The procedure for preparation of the polymer 1 in Example 1 was repeated except that diacetone acylamide was replaced with 60 parts of allyl acetoacetate, dimethylacrylamide was replaced with 40 parts of diethylacrylamide, and the synthesis conditions were adjusted.

Thus, a 20% aqueous solution of polymer 7 was prepared.
(Preparation of Ink)

The procedure for preparation of the ink 1 in Example 1 was repeated except that the 20% aqueous solution of polymer 1 was replaced with the 20% aqueous solution of polymer 7.

Thus, an ink of Example 7 was prepared.

Example 8

Preparation of Pigment Dispersion

The following components were mixed.

| | |
|---|---|
| Carbon black (gas black) (NIPEX 150 from Degussa AG) | 20 parts |
| 20% Aqueous solution of polymer 1 | 19 parts |
| Distilled water | 55 parts |

Next, a 10% aqueous solution of sodium hydroxide was added to the mixture to adjust the pH to 10, followed by adding distilled water to adjust the amount of the mixture to 100 parts. The mixture was then subjected to a dispersing treatment using a disc-type batch bead mill (KDL-type bead mill from Shinmaru Enterprises Corp. The dispersing conditions were as follows.
(1) Bead used: Zirconia beads with a diameter of 0.3 mm
(2) Peripheral speed of disc: 10 m/s
(3) Temperature of the mixture: 10° C.
(4) Dispersing time: 5 minutes Further, coarse particles were removed from the resultant dispersion using a centrifugal separator (MODEL 3600 from Kubota Corp. As a result, a pigment dispersion 8 having a volume average particle diameter of 110 nm and a standard deviation of particle diameter of 53.0 nm was prepared.
(Preparation of Ink)

The following components were mixed.

| | |
|---|---|
| Pigment dispersion 8 prepared above (Pigment content of 20% by weight) | 40.0 parts |
| Glycerin | 5.5 parts |
| 1,3-Butanediol | 16.5 parts |
| 2-Ethyl-1,3-hexanediol | 2.0 parts |
| Fluorine-containing surfactant (ZONYL FS-300 from Du Pont, solid content of 40% by weight) | 2.5 parts |
| Fluoroethylene - vinyl ether alternate copolymer (LUMIFLON FE4300 from Asahi Glass Co., Ltd., solid content of 50% by weight, volume average particle diameter of 150 nm, minimum film forming temperature (MFT) of not higher than 130° C.) | 6.0 parts |
| Distilled water | 27.5 parts |

Next, a 40% aqueous solution of aminoethylpropanediol was added to the mixture to adjust the pH to 10. In addition, 1.6 parts of adipic acid dihydrazide was added thereto, and the mixture was agitated for 30 minutes. Thus, an ink of Example 8 was prepared.

Examples 9 to 11

Preparation of Pigment Dispersions

The procedure for preparation of the pigment dispersion 8 in Example 8 was repeated except that the 20% aqueous solution of polymer 1 was replaced with each of the 20% aqueous solutions of polymers 2-4 while adjusting the added amount of the aqueous solutions of polymers 2-4 such that the viscosity of the resultant pigment dispersion is minimized Thus, pigment dispersions 9-11 were prepared.
(Preparation of Inks)
The procedure for preparation of the ink 8 in Example 8 was repeated except that the pigment dispersion 8 was replaced with each of the pigment dispersions 9-11.

Thus, inks of Examples 9-11 were prepared.

Examples 12 to 15

Preparation of Pigment Dispersions

The procedure for preparation of the pigment dispersion 8 in Example 8 was repeated except that the 20% aqueous solution of polymer 1 was replaced with the 20% aqueous solution of polymer 3 while adjusting the added amount of the aqueous solution of polymer 3 such that the viscosity of the resultant pigment dispersion is minimized, and the pH of each of the resultant dispersions was controlled to the pH described in Table 1 below.

Thus, pigment dispersions 12-15 were prepared.
(Preparation of Inks)
The procedure for preparation of the ink 8 in Example 8 was repeated except that the pigment dispersion 8 was replaced with each of the pigment dispersions 12-15.

Thus, inks of Examples 12-15 were prepared.

Example 16

Preparation of Pigment Dispersion

The procedure for preparation of the pigment dispersion 8 in Example 8 was repeated except that the 20% aqueous solution of polymer 1 was replaced with the 20% aqueous solution of polymer 6 while adjusting the added amount of the aqueous solution of polymer 6 such that the viscosity of the resultant pigment dispersion is minimized, and the pH of the resultant dispersion was adjusted to 10.

Thus, pigment dispersion 16 was prepared.
(Preparation of Ink)
The procedure for preparation of the ink 8 in Example 8 was repeated except that the pigment dispersion 8 was replaced with the pigment dispersion 16.

Thus, an ink of Example 16 was prepared.

Example 17

Preparation of Pigment Dispersion

The procedure for preparation of the pigment dispersion 8 in Example 8 was repeated except that the 20% aqueous solution of polymer 1 was replaced with the 20% aqueous solution of polymer 7 while adjusting the added amount of the aqueous solution of polymer 7 such that the viscosity of the resultant pigment dispersion is minimized, and the pH of the resultant dispersion was adjusted to 10.

Thus, pigment dispersion 17 was prepared.
(Preparation of Ink)
The procedure for preparation of the ink 8 in Example 8 was repeated except that the pigment dispersion 8 was replaced with the pigment dispersion 17.

Thus, an ink of Example 17 was prepared.

Example 18

Preparation of Ink

The ink 8 was used.
(Preparation of Pretreatment Liquid)
The following components were mixed and agitated to prepare a pretreatment liquid.

| | |
|---|---|
| Sodium lactate | 8.0 parts |
| Glycerin | 5.5 parts |
| 1,3-Butanediol | 16.5 parts |
| 2-Ethyl-1,3-hexanediol | 2.0 parts |
| Fluorine-containing surfactant (ZONYL FS-300 from Du Pont, solid content of 40% by weight) | 2.5 parts |
| Distilled water | 65.5 parts |

Example 19

Preparation of Ink

The ink 1 was used.
(Preparation of Pretreatment Liquid)
The pretreatment liquid prepared in Example 18 was used.

Example 20

Preparation of Pigment Dispersion

The procedure for preparation of the pigment dispersion 8 in Example 8 was repeated except that the carbon black was replaced with another carbon black (furnace black #960 from Mitsubishi Chemical Corp.) while adjusting the added amount of the aqueous solution of polymer 1 such that the viscosity of the resultant pigment dispersion is minimized Thus, a pigment dispersion 20 was prepared.
(Preparation of Ink)
The procedure for preparation of the ink 8 in Example 8 was repeated except that the pigment dispersion 8 was replaced with the pigment dispersion 20.

Thus, an ink of Example 20 was prepared.

Example 21

Synthesis of Polymer 21

The following components were fed into a flask equipped with an agitator, a thermometer, a dropping funnel and a reflux condenser.

| | |
|---|---|
| Diacetone acrylamide | 40 parts |
| Acrylamide | 60 parts |
| Ethanol | 50 parts |

After air in the flask was substituted with a nitrogen gas, the mixture was heated to 80° C. Next, 0.5 parts of 2,2'-azobisisobutyronitrile was dropped into the flask using the dropping funnel to perform a polymerization reaction for 6 hours.

After preparing the polymerization reaction, ethanol vapor was fed into the flask to prepare a 50% ethanol solution of a diacetone acrylamide-acrylamide copolymer. By washing the copolymer with ethanol, followed by drying, a solid diacetone acrylamide-acrylamide copolymer (hereinafter sometimes referred to as a polymer 21 or DAA(40)-ACA(60)), in which the weight ratio (DAA/ACA) of the diacetone acrylamide unit (DAA) to the acrylamide unit (ACA) is 40/60, was prepared. The polymer 21 was mixed with distilled water to prepare a 20% aqueous solution of the polymer 21.

(Preparation of Ink)

The procedure for preparation of the ink 1 in Example 1 was repeated except that the 20% aqueous solution of polymer 1 was replaced with the 20% aqueous solution of polymer 21.

Thus, an ink of Example 21 was prepared.

Comparative Example 1

Synthesis of Polymer

The procedure for preparation of the polymer 1 in Example 1 was repeated except that the added amounts of diacetone acrylamide and dimethylacrylamide were changed to 30 parts and 70 parts, respectively.

Thus, a polymer of Comparative Example 1 was prepared.

(Preparation of Ink)

The procedure for preparation of the ink 1 in Example 1 was repeated except that the 20% aqueous solution of polymer 1 was replaced with the 20% aqueous solution of polymer of Comparative Example 1.

Thus, an ink of Comparative Example 1 was prepared.

Comparative Example 2

Synthesis of Polymer

The procedure for preparation of the polymer 1 in Example 1 was repeated except that the added amounts of diacetone acrylamide and dimethylacrylamide were changed to 100 parts and 0 part, respectively.

Thus, a polymer of Comparative Example 2 was prepared.

(Preparation of Ink)

The procedure for preparation of the ink 1 in Example 1 was repeated except that the 20% aqueous solution of polymer 1 was replaced with the 20% aqueous solution of polymer of Comparative Example 2.

Thus, an ink of Comparative Example 2 was prepared.

Comparative Examples 3 and 4

The procedure for preparation of the ink 1 in Example 1 was repeated except that the 20% aqueous solution of polymer 1 was replaced with the 20% aqueous solution of polymer 3 while the pH of each of the resultant inks was adjusted to the pH described in Table 1 below.

Thus, inks of Comparative Examples 3 and 4 were prepared.

Comparative Example 5

The procedure for preparation of the ink 1 in Example 1 was repeated except that the 20% aqueous solution of polymer 1 was replaced with an aqueous dispersion of a urethane acrylic resin, NIPPOLAN WL-530 from Nippon Polyurethane Industry Co., Ltd., which was diluted by distilled water so as to have a solid content of 20% by weight.

Thus, an ink of Comparative Example 5 was prepared.

Comparative Example 6

Synthesis of Polymer

The procedure for preparation of the polymer 1 in Example 1 was repeated except that the added amounts of diacetone acylamide and dimethylacrylamide were changed to 60 parts and 30 parts, respectively, and 10 parts of acrylic acid was added while the synthesis conditions were adjusted.

Thus, a 20% aqueous solution of polymer of Comparative Example 6 was prepared.

(Preparation of Ink)

The procedure for preparation of the ink 1 in Example 1 was repeated except that the 20% aqueous solution of polymer 1 was replaced with the 20% aqueous solution of polymer of Comparative Example 6.

Thus, an ink of Comparative Example 6 was prepared.

The inks of Examples 1-21 and Comparative Examples 1-6 were evaluated with respect to the following properties.

1. Preservation Stability of Ink

Each ink was contained in a container while sealed, and preserved for 2 weeks at 70° C. The viscosity of the ink was measured before and after the preservation test to determine the rate of change in viscosity to determine rate of change in viscosity. The rate of change in viscosity is determined from the following equation:

$$\text{Rate of change in viscosity}(RC)(\%) = \{(Va-Vb) \times 100\}/Vb,$$

wherein Va represents the viscosity of the ink after the preservation test, and Vb represents the viscosity of the ink before the preservation test.

In this regard, the smaller rate of change in viscosity the ink has, the better preservation stability the ink has.

2. Image Density

Each ink was contained in an ink cartridge for black ink of the inkjet recording apparatus illustrated in FIG. 1 and set to the inkjet recording apparatus. In addition, the pretreatment liquid was contained in an ink cartridge for pretreatment liquid, and the cartridge was set to the inkjet recording apparatus (only for Examples 18 and 19).

When the pretreatment liquid was not used, a solid ink image with a length of 50 mm and a width of 50 mm was formed on a paper, PPC paper 4024 from Xerox Corp.

When the pretreatment liquid was used, a solid image with a length of 50 mm and a width of 50 mm was formed on the paper, PPC paper 4024, using the pretreatment liquid, and then a solid ink image with a length of 50 mm and a width of 50 mm was formed on the portion of the paper coated with the pretreatment liquid.

The image density of the solid ink image was measured with a densitometer from X-Rite Inc.

With respect to the image density, the greater the better.
The evaluation results are shown in Table 1.

TABLE 1

| | Pigment dispersion | | | Ink | | Pretreatment | Evaluation results | |
|---|---|---|---|---|---|---|---|---|
| | | | | | | | Image | Preservation stability |
| | CB* | Dispersant | pH | Polymer | pH | liquid | density | (RC) (%) |
| Ex. 1 | N150 | NS*² | 4 | DAA (40)-DMA (60) | 10 | No | 1.20 | 10 |
| Ex. 2 | N150 | NS | 4 | DAA (50)-DMA (50) | 10 | No | 1.25 | 10 |
| Ex. 3 | N150 | NS | 4 | DAA (60)-DMA (40) | 10 | No | 1.31 | 10 |
| Ex. 4 | N150 | NS | 4 | DAA (90)-DMA (10) | 10 | No | 1.32 | 10 |
| Ex. 5 | N150 | NS | 4 | DAA (60)-DMA (40) | 9 | No | 1.31 | 12 |
| Ex. 6 | N150 | NS | 4 | AAA (60)-DMA (40) | 10 | No | 1.34 | 10 |
| Ex. 7 | N150 | NS | 4 | AAA (60)-DEA (40) | 10 | No | 1.31 | 10 |
| Ex. 8 | N150 | DAA*³ (40)-DMA*⁴ (60) | 10 | — | 10 | No | 1.30 | 5 |
| Ex. 9 | N150 | DAA (50)-DMA (50) | 10 | — | 10 | No | 1.35 | 5 |
| Ex. 10 | N150 | DAA (60)-DMA (40) | 10 | — | 10 | No | 1.38 | 5 |
| Ex. 11 | N150 | DAA (90)-DMA (10) | 10 | — | 10 | No | 1.40 | 5 |
| Ex. 12 | N150 | DAA (60)-DMA (40) | 9.5 | — | 10 | No | 1.40 | 6 |
| Ex. 13 | N150 | DAA (60)-DMA (40) | 11 | — | 10 | No | 1.43 | 5 |
| Ex. 14 | N150 | DAA (60)-DMA (40) | 9 | — | 10 | No | 1.40 | 18 |
| Ex. 15 | N150 | DAA (60)-DMA (40) | 12 | — | 10 | No | 1.25 | 5 |
| Ex. 16 | N150 | AAA*⁵ (60)-DMA (40) | 10 | — | 10 | No | 1.43 | 5 |
| Ex. 17 | N150 | AAA (60)-DEA*⁶ (40) | 10 | — | 10 | No | 1.40 | 5 |
| Ex. 18 | N150 | DAA (40)-DMA (60) | 10 | — | 10 | Yes | 1.45 | 5 |
| Ex. 19 | N150 | NS | 4 | DAA (40)-DMA (60) | 10 | Yes | 1.38 | 5 |
| Ex. 20 | #960 | DAA (40)-DMA (60) | 10 | — | 10 | No | 1.20 | 5 |
| Ex. 21 | N150 | NS | 4 | DAA (40)-ACA*⁷ (60) | 10 | No | 1.18 | 10 |
| Comp. Ex. 1 | N150 | NS | 4 | DAA (30)-DMA (70) | 10 | No | 1.05 | 15 |
| Comp. Ex. 2 | N150 | NS | 4 | DAA (100) | 10 | No | 1.35 | 300 |
| Comp. Ex. 3 | N150 | NS | 4 | DAA (60)-DMA (40) | 8 | No | 1.25 | 30 |
| Comp. Ex. 4 | N150 | NS | 4 | DAA (60)-DMA (40) | 7 | No | 1.31 | 80 |
| Comp. Ex. 5 | N150 | NS | 4 | NIPPOLAN WL530 | 10 | No | 1.04 | 15 |
| Comp. Ex. 6 | N150 | NS | 4 | DAA (60)-DMA (30)-AA*⁸ (10) | 10 | No | —*⁹ | 200 |

CB*: Carbon black used, N150: NIPEX 150
NS*²: Sodium salt of formalin condensate of naphthalene sulfonic acid
DAA*³: Diacetone acrylamide
DMA*⁴: Dimethylacrylamide
AAA*⁵: Ally acetoacetate
DEA*⁶: Diethylacrylamide
ACA*⁷: Acrylamide
AA*⁸: Acrylic acid
—*⁹: The ink could not be evaluated because of having too high a viscosity.

It is clear from Table 1 that the inks of Examples 1-21 can produce high density images while having good preservation stability. In addition, by applying the pretreatment liquid before image formation, the image density can be enhanced.

Additional modifications and variations of this disclosure are possible in light of the above teachings. It is therefore to be understood that within the scope of the appended claims the invention may be practiced other than as specifically described herein.

What is claimed is:

1. An inkjet ink comprising:
   water;
   a pigment;
   a polymer which does not include an anionic unit and includes a first unit having a carbonyl group capable of reacting with a hydrazino group, and a second unit having at least one of an amino group, a dimethylamino group, and a diethylamino group, wherein the first unit is included in the polymer in an amount of from 40% to 90% by weight based on a total weight of the polymer; and
   a hydrazine compound in an amount of 8 to 20 parts by weight based on 100 parts by weight of the polymer,
   wherein the ink has a pH of not less than 9.

2. The inkjet ink according to claim 1, wherein the inkjet ink is prepared by a method including:
   dispersing the pigment in a dispersion medium including water and the polymer to prepare a dispersion of the pigment while adjusting a pH of the dispersion so as to be from 9 to 11.

3. The inkjet ink according to claim 1, wherein the carbonyl group capable of reacting with a hydrazino group is a diacetone acrylaminde group or an acetoacetyl group.

4. An image forming method comprising:
   treating a surface of a recording material with a pretreatment liquid including an acidic compound; and
   then forming an ink image on the treated surface of the recording material using the inkjet ink according to claim 1.

5. An ink cartridge comprising:
   a first container containing a pretreatment liquid including an acidic compound; and
   a second container containing the inkjet ink according to claim 1.

6. An inkjet recording apparatus comprising:
   the ink cartridge according to claim 5; and
   a recording head to eject droplets of the pretreatment liquid contained in the first container of the ink cartridge to treat a surface of a recording material with the pretreatment liquid, followed by ejecting droplets of the inkjet ink contained in the second container of the ink cartridge to form an image on the treated surface of the recording material.

7. A print comprising:
   a support; and
   an ink image formed on the support using the inkjet ink according to claim 1.

* * * * *